(12) United States Patent
Ollila et al.

(10) Patent No.: US 7,804,288 B2
(45) Date of Patent: Sep. 28, 2010

(54) CURRENT MEASURING ARRANGEMENT OF A FREQUENCY CONVERTER

(75) Inventors: Jaakko Ollila, Pirkkala (FI); Risto Komulainen, Klaukkala (FI); Lasse Kortelahti, Lángáminne (FI)

(73) Assignee: Vacon Oyj, Vaasa (FI)

( * ) Notice: Subject to any disclaimer, the term of this patent is extended or adjusted under 35 U.S.C. 154(b) by 315 days.

(21) Appl. No.: 12/000,439

(22) Filed: Dec. 12, 2007

(65) Prior Publication Data

US 2008/0150515 A1    Jun. 26, 2008

(30) Foreign Application Priority Data

Dec. 21, 2006    (FI) ................... 20061145

(51) Int. Cl.
*G01R 19/00* (2006.01)
*H02M 5/458* (2006.01)

(52) U.S. Cl. .................. 324/76.11; 324/713; 363/37

(58) Field of Classification Search .............. 324/76.11; 363/34–37
See application file for complete search history.

(56) References Cited

U.S. PATENT DOCUMENTS

| | | | |
|---|---|---|---|
| 4,521,840 A | 6/1985 | Hoadley | |
| 5,140,514 A * | 8/1992 | Tuusa et al. | ................... 363/81 |
| 5,982,136 A | 11/1999 | Pelly | |
| 2004/0169488 A1* | 9/2004 | Maeda et al. | ................ 318/801 |
| 2006/0044848 A1* | 3/2006 | Suzuki et al. | .................. 363/37 |
| 2006/0265160 A1* | 11/2006 | Komulainen et al. | .......... 702/75 |

FOREIGN PATENT DOCUMENTS

| | | |
|---|---|---|
| EP | 0977337 A2 | 2/2000 |
| FI | 108819B B | 8/2001 |
| FI | 116337B B | 6/2005 |

OTHER PUBLICATIONS

Blaabjerg, Frede et al., SingleCurrent Sensor Technique in the DC Link of a Three-Phase PWM-VS Inverters: A Review and a Novel Solution, Sep./Oct. 1997, IEEE, Transactions on Industry Applications, vol. 33, No. 5, pp. 1241-1253.*

* cited by examiner

*Primary Examiner*—Timothy J Dole
(74) *Attorney, Agent, or Firm*—Birch, Stewart, Kolasch & Birch, LLP

(57) ABSTRACT

A method and a corresponding appliance for measuring the output current of a frequency converter, the frequency converter including a network bridge that can be connected to an AC network, a controllable three-phase load bridge that can be connected to an AC load, and a DC intermediate circuit between them, the DC intermediate circuit including a filter capacitor that includes controllable semiconductor switches in each phase and that are controlled by pulse-width modulation, and in which the currents of the output phases are determined based on measured samples of the current of the filter capacitor of the DC intermediate circuit.

20 Claims, 4 Drawing Sheets

CURRENT MEASURING ARRANGEMENT OF A FREQUENCY CONVERTER

FIELD OF TECHNOLOGY

Figure 1:
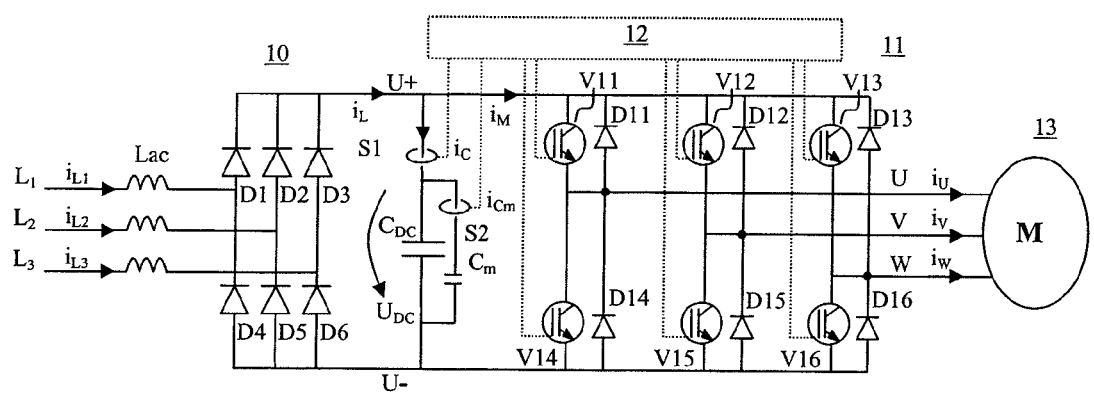

The present invention relates to a method and an appliance for measuring the currents of a frequency converter. More particularly, the invention relates to a method and an appliance for measuring the network currents, i.e. the input currents, and the motor currents, i.e. the output currents, of a frequency converter that contains a network bridge that can be connected to an AC network and a load bridge that can be connected to an AC load as well as a DC intermediate circuit between them.

PRIOR ART

Conventionally the output currents of a frequency converter, of which reasonably good performance capability of motor regulation is desired, are measured with either two or three current transformers. Samples of the output currents are taken for regulation purposes generally at the midpoint of the null vector of the output voltage, in which the harmonics content of the measuring signal is at its smallest. A drawback of this measuring method is that it is expensive, because as many as 3 transformers are needed.

The Finnish patent publication 116337 presents an appliance for measuring the output currents of a frequency converter, wherein one current sensor situated in the DC intermediate circuit is used for forming signals corresponding to the current of the DC circuit of the frequency converter as well as a measuring unit, in which the current values of the DC intermediate circuit of the frequency converter are converted into signals corresponding to the current. In addition to this, the measuring unit incorporates a memory, in which the value of the signal at the time and of the previous signal are recorded, as well as a difference element for forming a current value corresponding to each phase current of an output as a difference between consecutive signals. With the method, however, there is a limitation relating to the formation of the output voltage in that only two switch pairs are modulated during one modulation cycle.

The current on the supply network side of the frequency converter is generally measured only when the network bridge of the frequency converter is active. According to prior art, in this case the current transformers are used similarly as on the output side also, either 2 or 3 units.

SUMMARY OF THE INVENTION

The purpose of this invention is to achieve a new kind of measuring arrangement for measuring the current of a frequency converter, with which arrangement data is obtained about the instantaneous values of both the output currents and the input currents using only one current sensor. Input current data is obtained irrespective of whether an active or a passive network bridge is in use.

According to the invention the current is measured with one current sensor situated in the intermediate circuit, which current sensor is positioned in series with the capacitor filtering the DC voltage of the intermediate circuit or with the smaller measuring capacitor connected in parallel with it. The sensor can be e.g. a parallel resistor, i.e. a shunt resistor, or a transformer based on the Hall effect. The current of the capacitor can in some cases be deduced also on the basis of the measurement of the voltage of the filter capacitor without a separate current sensor.

The measurement result of the current sensor positioned according to the invention always shows a step-like change when the position of the power switch of either the network bridge or of the load bridge changes. The magnitude of the current change is the same as the instantaneous value of an input phase current or of an output phase current. The phase in question can according to the invention be deduced from the positions of the power switches before and after the change. In addition, by taking into account the fact that the rate of change of both the input current and the output current can be estimated reasonably accurately during the time that each input voltage vector or output voltage vector is effective, the instantaneous values of the currents at the desired moment in time can be calculated. Thus roughly the same situation as with conventional systems based on a number of current transformers is achieved, in which a sample of the currents is taken e.g. two times during a modulation cycle, at the start and at the midpoint of the null vector.

Use of the method according to the invention requires that the controls of the power switches of the active network bridge and of the load bridge are synchronized with each other in order for the sample of the currents to be taken in the manner desired.

The characteristic features of the solution according to the invention are described in detail in the claims below.

SHORT DESCRIPTION OF THE DRAWINGS

Figure 2:
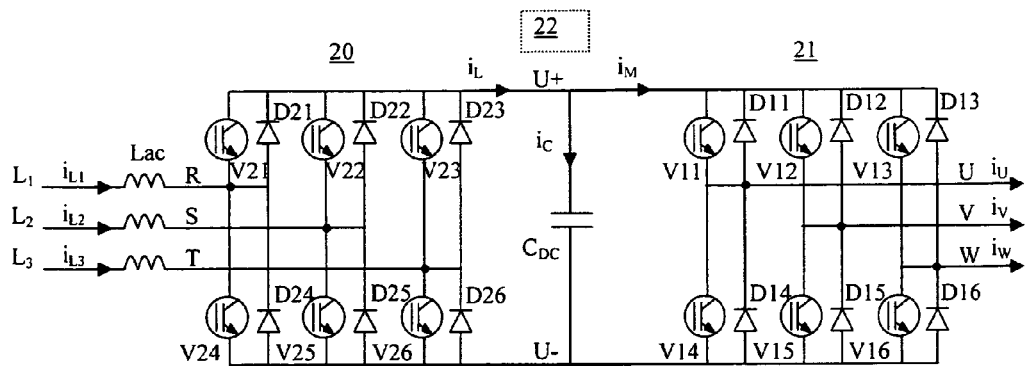
Figure 3:
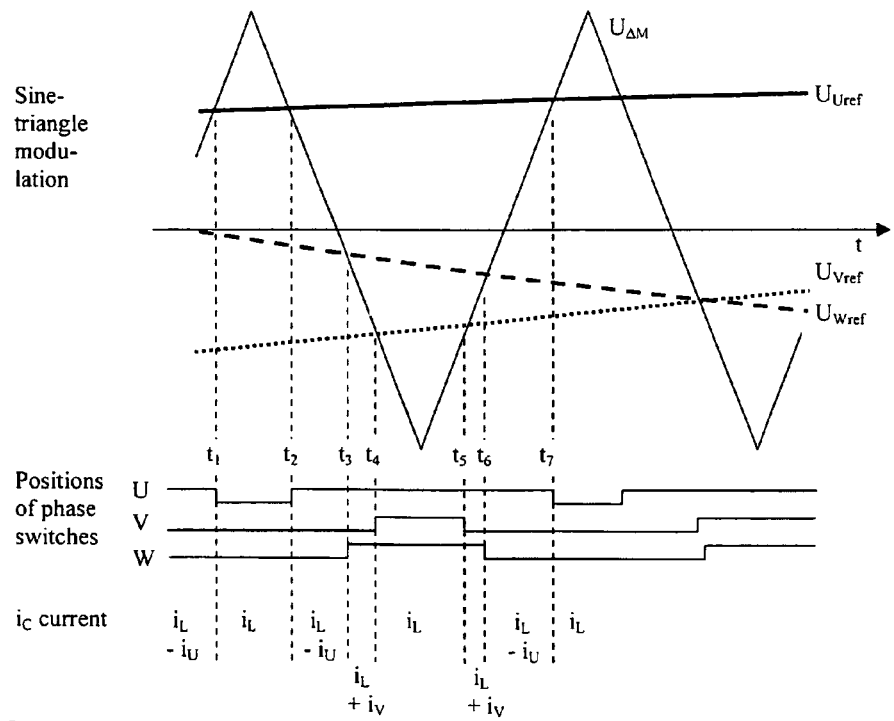
Figure 4:
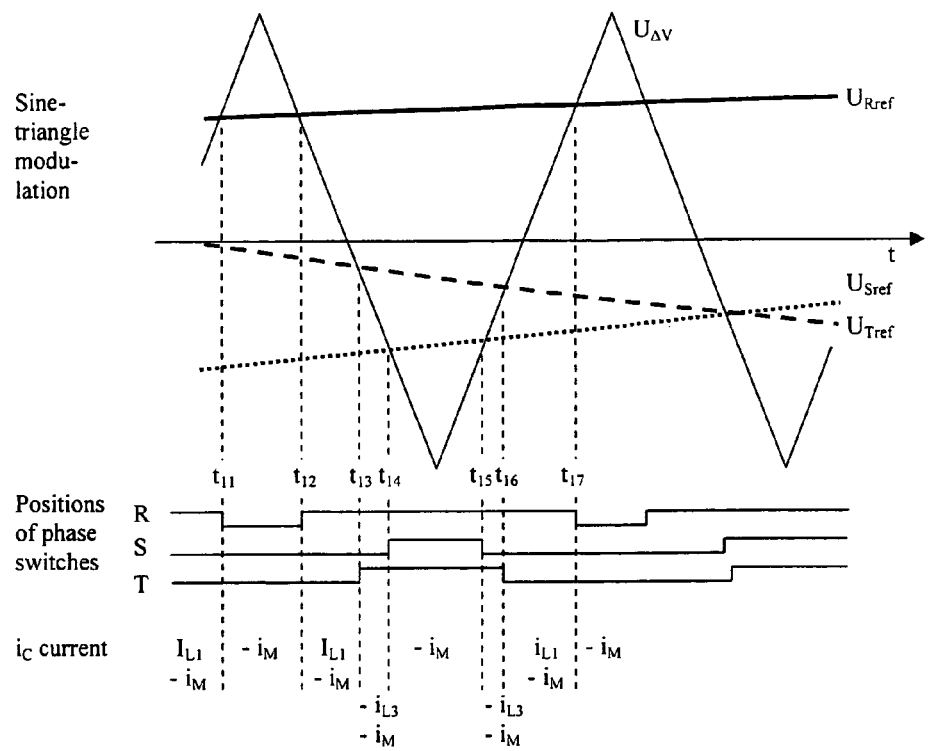
Figure 5:
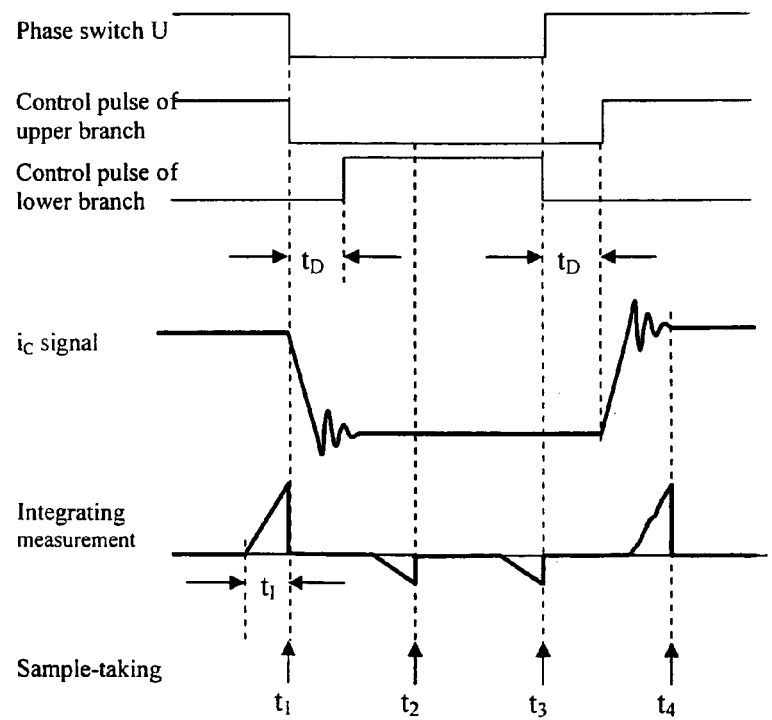
Figure 6:
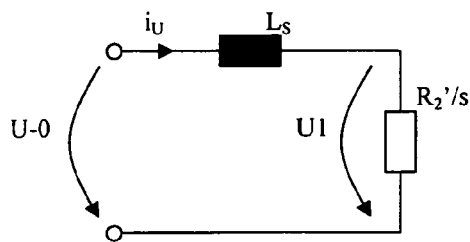
Figure 7:
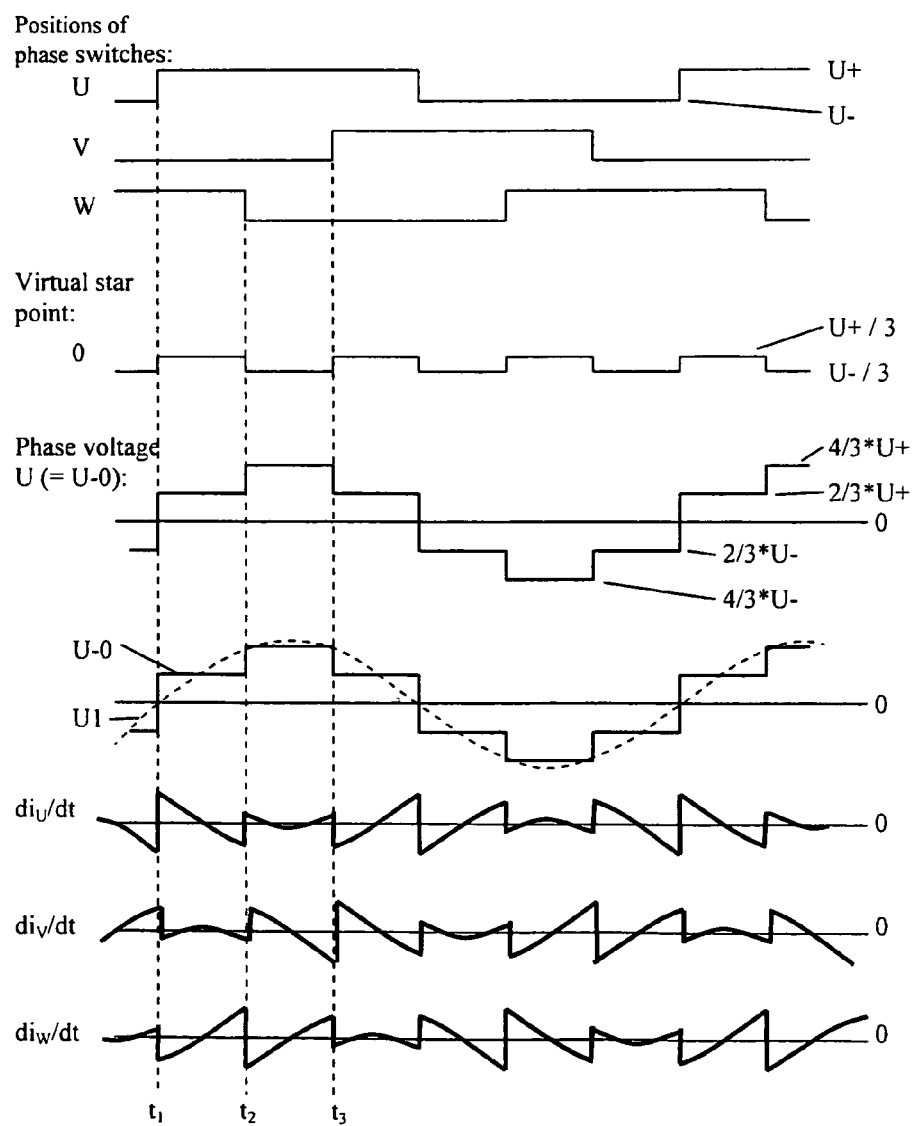

In the following, the invention will be described in more detail by the aid some embodiments with reference to the attached drawings, wherein FIG. 1 presents the main circuit of a frequency converter provided with a passive network bridge, FIG. 2 presents the main circuit of a frequency converter provided with an active passive network bridge, FIG. 3 presents the sine-triangle modulation of the load bridge and the output currents in the intermediate circuit, FIG. 4 presents the sine-triangle modulation of the network bridge and the input currents in the intermediate circuit, FIG. 5 presents the turning of a phase switch, the current of the intermediate circuit and a sample of the current, FIG. 6 presents a simplified 1-phase equivalent circuit of a 3-phase squirrel-cage motor, FIG. 7 presents the rates of change of the motor currents during the active vectors.

DETAILED DESCRIPTION OF THE INVENTION

FIG. 1 presents the main circuit of a normal three-phase PWM frequency converter, in which is a filter choke Lac of the supply side, a network bridge 10 comprised of diodes the D1-D6 for rectifying the three-phase alternating voltage of the supply network into the DC voltage $U_{DC}$ of the DC intermediate circuit, a filtering capacitor $C_{DC}$ of the DC voltage, a load bridge 11 comprised of three phase switches implemented with power semiconductors, which forms the three-phase output voltage $U_U$, $U_V$, $U_W$, from the DC voltage of the intermediate circuit, and a control unit 12. The phase switch comprises the controllable power semiconductor switches, preferably the IGBTs V11-V16, of the upper branch and the lower branch, as well as the diodes D11-D16 connected in parallel with them. A DC choke situated in the DC intermediate circuit is generally also used instead of the filter choke Lac of the supply network side presented in the figure, which solution is comparable from the standpoint of this invention.

The phase switch connects the output phase to either the U+ busbar (upper position) or the U− busbar (lower position).

The turning of the switch e.g. from the upper position to the lower position occurs according to FIG. 5 such that first the control pulse of the leading IGBT of the upper branch ceases and after expiry of the so-called dead time $t_D$ the control pulse of the IGBT of the lower branch starts. The control pulses are formed in the so-called modulator of the control unit.

The current measuring according to this invention is implemented with one current sensor S1, which is positioned in series with the filter capacitor $C_{DC}$ of the intermediate circuit measuring its current $i_C$, which according to the figure is the difference between the current $i_L$ of the DC intermediate circuit of the network bridge side and the current $i_M$ of the DC intermediate circuit of the load bridge side.

FIG. 2 presents the main circuit of a PWM frequency converter provided with an active network bridge, which differs from the main circuit presented in FIG. 1 mainly in that the network bridge 20 controlled with the control unit 22 comprises three similar phase switches implemented with the power semiconductors V21-V26 and the diodes D21-D26 as the load bridge 11. The figure presents only the choke Lac as the filter unit of the network current.

The positions of phase switches of the load bridge are determined in the so-called pulse-width modulator (PWM) of the control unit. A prior art modulation method is sine-triangle modulation, which is used as an example in the description of the method according to this invention, and of which the implementation in principle and the formation of the measuring current signal $i_C$ according to the invention when using it are presented in FIG. 3.

In sine-triangle modulation each phase voltage has its own sinusoidal reference signal ($U_{Uref}$, $U_{Vref}$, $U_{Wref}$), which are compared to the common triangle signal $U_{AM}$. As a result of the comparison, three position references U, V and W of the phase switches according to FIG. 3 are obtained, in which the "1" position means that in the main circuit the power semiconductor switch controlled by the upper branch leads and in the "0" position the switch of the lower branch leads. The cycle time of the triangle signal is designated the switching cycle, during which each phase switch makes one back-and-forth change in position. The switch positions, in which the phase switches are in different positions, are designated active vectors (e.g. $t_2$-$t_3$) and correspondingly the switch positions, in which each phase switch is in the same position, are designated null vectors (e.g. $t_1$-$t_2$).

The figures also show the data about the output currents in view of the current sensor situated according to the invention. For example, in the interval $t_1$-$t_2$, when all the phase switches are in the lower position, the current on the load bridge side of the intermediate circuit is ($i_M$) 0. In this case the current of the current sensor is the same as the current $i_L$ on the network bridge side of the intermediate circuit. Likewise, in e.g. the interval $t_2$-$t_3$, when the U phase switch is in the upper position and the other phase switches are in the lower position, the current of the load bridge side of the intermediate circuit is the same as the current $i_U$ of the U phase, in which case the current of the current sensor $i_C$=$i_L$-$i_U$. Table 1 presents according to the markings of FIG. 1 the dependencies between all the different switch positions and the output phase currents visible in the $i_C$-signal, on the basis of which the output currents can be reconstructed for each phase. The network current cannot in this case be reconstructed for each specific phase nor is there normally a need for it in a frequency converter provided with a diode bridge.

TABLE 1

| U | V | W | $i_C$ |
|---|---|---|---|
| 0 | 0 | 0 | $i_L$ |
| 1 | 0 | 0 | $i_L - i_U$ |
| 0 | 1 | 0 | $i_L - i_V$ |
| 0 | 0 | 1 | $i_L - i_W$ |
| 1 | 1 | 0 | $i_L + i_W$ |
| 0 | 1 | 1 | $i_L + i_U$ |
| 1 | 0 | 1 | $i_L + i_V$ |
| 1 | 1 | 1 | $i_L$ |

FIG. 4 presents an implementation in principle of sine-triangle modulation determined by the positions of the phase switches of an active network bridge according to FIG. 2 and the formation of a current signal $i_C$ to be measured according to the invention. In sine-triangle modulation each phase voltage has its own sinusoidal reference signal ($U_{Rref}$, $U_{Sref}$, $U_{Tref}$), which are compared to the common triangle signal $U_{ΔV}$. As a result of the comparison, three position references R, S and T of the phase switches according to FIG. 4 are obtained, in which the "1" position means that in the main circuit the power semiconductor switch controlled by the upper branch leads and in the "0" position the switch of the lower branch leads.

The figures also show the data about the output currents in view of the current sensor situated according to the invention. For example, in the interval $t_{11}$-$t_{12}$, when all the phase switches are in the lower position, the current on the network bridge side of the intermediate circuit is ($i_L$) 0. In this case the current of the current sensor is the same as the current of the load bridge side of the intermediate circuit but negative (-$i_M$). Likewise, in e.g. the interval $t_{12}$-$t_{13}$, when the R phase switch is in the upper position and the other phase switches are in the lower position, the current of the network bridge side of the intermediate circuit is the same as the current $i_{L1}$ of the R phase, in which case the current of the current sensor $i_C$=$i_{L1}$-$i_M$. Table 2 presents according to the markings of FIG. 2 the dependencies between all the different switch positions and the input phase currents visible in the $i_C$ signal, on the basis of which the input currents can be reconstructed for each phase.

TABLE 2

| R | S | T | $i_C$ |
|---|---|---|---|
| 0 | 0 | 0 | $-i_M$ |
| 1 | 0 | 0 | $i_{L1} - i_M$ |
| 0 | 1 | 0 | $i_{L2} - i_M$ |
| 0 | 0 | 1 | $i_{L3} - i_M$ |
| 1 | 1 | 0 | $-i_{L3} - i_M$ |
| 0 | 1 | 1 | $-i_{L1} - i_M$ |
| 1 | 0 | 1 | $-i_{L2} - i_M$ |
| 1 | 1 | 1 | $-i_M$ |

Reconstruction of the output currents from the signal of the current sensor is based on the general nature of a three-phase system (the sum of both the input currents and the output currents is 0) and on the characteristics of a modulator based on sine-triangle comparison. A sample is taken from the current (from the $i_C$ current) of the DC intermediate circuit according to this invention in conjunction with turnings of the phase switches in the manner presented in FIG. 5. The figure presents a typical control arrangement of power switches, in which e.g. when the position reference of the phase switch turns from up to down, first the control pulse of the leading IGBT of the upper branch is stopped and after a so-called dead time $t_D$ (e.g. 2 µs) the control pulse of the lower branch is started.

The turning of each phase switch of the active network bridge or of the load bridge causes a change in the current $i_C$ measured by the current sensor. According to the invention the first sample of the current to be measured is taken at the same moment as the gate control pulse of the leading IGBT ceases, e.g. at the moments of time $t_1$ and $t_3$ of FIG. 5. Correspondingly the second sample is taken after a suitable delay subsequent to the starting of the control pulse of the firing IGBT, in the example of the figure at the moments of time $t_2$ and $t_4$. The delay ($t_2$-$t_1$ and $t_4$-$t_3$ in FIG. 5) is preferably so long that the vibration phenomena subsequent to the firing of an IGBT have subsided, e.g. 5 µs. A delay of this order of magnitude is so short that the input currents and output currents to be measured do not have time during that period to change substantially, so that with respect to them the first and the second sample are in practice simultaneous.

The magnitude and duration of vibrations disturbing the sample-taking depend on, among other things, the capacitance of the motor cable which, for its part, the length of the cable affects. Any random error in the sample-taking caused by vibrations can be eliminated by using the integrating sample-taking principle presented in FIG. 5. In the method a time integral of the signal to be measured is formed during a defined measuring period $t_1$, e.g. 3 µs, and the sample-taking is performed at the end of the period.

With the sample-taking principles describe above, the rate of change of the output currents is obtained twice during the switching cycle taking into account, in practice simultaneously, samples of two phase currents, on the basis of which the instantaneous value of also the third phase current can be calculated. For example, at the times $t_3$ and $t_6$ of FIG. 3, samples of the output currents $i_U$ and $-i_V$ are measured, from which the third current $i_W=-i_U-i_V$ can be calculated (the value of the DC current of the network bridge side is in this case ascertained during the null vector $t_1$-$t_2$ and/or $t_4$-$t_5$, so that its proportion can be eliminated from the measuring results). Based on the samples the measurement can also be ascertained from the rate of change of the phase current (e.g. the rate of change di/dt of the $i_U$ current in the interval $t_2 \ldots t_3$ can be calculated directly from their current samples of these times). The rate of change of the other phase currents can be calculated with sufficient accuracy in accordance with FIGS. 6 and 7 and the explanations relating to them.

In the case of an active network bridge the sample-taking from the input currents functions similarly to the sample-taking of the output currents described above. In order for the connection between the measurement result of the current sensor and the input current or output current connected to it to function in the manner according to this invention, the modulators of the network bridge and of the load bridge must in this case be synchronized with each other such that the phase switches of only one or the other bridge turn position at a time.

FIG. 6 presents a single-phase simplified equivalent circuit of a 3-phase squirrel-cage motor, such as is normally controlled with a frequency converter, from which the less significant components from the standpoint of forming a measured motor current according to this invention have been omitted. The following markings are used in the figure:

U-0=phase voltage
U1=counter-EMF (electromotive force)
$L_S$=reactance restricting change in current (mainly the sum of the stray reactance of the stator and the rotor)
$R_2'$/s=resistance of rotor circuit Based on the figure, it can be seen that the rate of change of the current of the motor can be calculated when the phase voltage supplied to the motor, the counter-EMF and the stray reactance of the stator are known:

$$di/dt=[(U-0)-U1]/L_S$$

FIG. 7 presents how the data needed for determining the rate of change of the current can be derived in the case of the motor circuit. For the sake of clarity, the figure presents the full output voltage situation, a so-called "six step" voltage diagram. The figure presents:

The positions/potentials of the U, V and W phase switches, which alternate between U+ and U−

The potential 0 of the virtual star point is the same as the average of the output voltages, so that in the case of the figure it varies between U+/3 and U−/3 In a situation in which all the output switches are in the same position, the potential of the virtual star point is, in accordance with its definition, the same as the potential of the phase switches also (not shown in the figure).

The phase voltage supplied to the motor, e.g. U as presented in the figure, is the difference of the voltage between the output voltage in question and the virtual star point, which in the case of the figure varies between 4/3*U+ and 4/3*U−. When all the phase switches are in the same position, also all the phase voltages are 0.

The sinusoidal descriptor U1 of the counter-EMF of the motor, which can either be calculated on the basis of the motor model or alternatively the basic wave of the phase voltage U can be used as a rough value (which is comparable to the sine wave used in the sine-triangle modulator). With the current estimated over a sufficiently short interval, the error arising from this simplification is minor.

The voltage diagram of the difference between the phase voltage U and the counter-EMF U1, which according to FIG. 6 and the explanations relating to it is comparable to the rate of change $di_U/dt$ of the phase current. In the simplified case of the figure, the phase switches are never in the same position, in which type of situation the difference between the voltages in question and the rate of change of the phase current are of course of the magnitude of the instantaneous value of the counter-EMF.

The rates of change of the other phase currents $di_V/dt$ and $di_W/dt$ calculated in a corresponding manner.

Since the sum of the changes of the phase currents is 0 and the mutual magnitudes of their rates of change can be calculated in the manner presented above, the current changes of the other phases in the same interval also can be calculated on the basis of the change of one measured phase current. Thus it is possible to reconstruct the instantaneous value of each phase current in advance or in retrospect at each point of change closest to the output voltage vector (times $t_1, t_2 \ldots t_7$ etc. in FIG. 3) or at any point in time desired.

In the case of an active network bridge, calculation of the current changes functions in a similar manner:

the estimated network current, which is obtained from the modulator of the network bridge, corresponds to the counter-EMF of FIG. 6, and the filter choke Lac corresponds to the reactance limiting the change of current the logic according to FIG. 7 functions fully correspondingly to that on the motor side.

The conventional current measuring moment observed to be good is located at the midpoint of the null vector (=the tip of the triangle, thus e.g. approximately at the midpoint of the times $t_4 \ldots t_5$ in FIG. 3). With the method according to this invention the same result is achieved (by calculating in this case the average of the measured and calculated currents at the times $t_4$ and $t_5$).

In heavy-duty frequency converters, in which the capacitance of the filter capacitor is very large and it comprises a number of different components connected in parallel, another current sensor S2 can preferably be connected in series with a separate measuring capacitor $C_m$ that is connected in parallel with the filter capacitors $C_{DC}$. The current to be measured $i_{C_m}$ is in this case smaller in relation to the parallel connection of the capacitances of other storage capacitors than the actual current $i_C$ according to FIGS. 1 and 2.

When the filter capacitor of the intermediate circuit is very small, e.g. according to patent publication FI 108819, the current can be deduced according to one embodiment of the invention on the basis of measurement of the voltage of the filter capacitor without a separate current sensor, basing it on the fact that the rate of change of the voltage of the capacitor is directly comparable to the current of the capacitor.

It is obvious to the person skilled in the art that the different embodiments of the invention are not limited solely to the examples described above, but that they may be varied within the scope of the claims presented below.

The invention claimed is:

1. A method for measuring the output current of a frequency converter including a network bridge connectable to an AC network, a controllable three-phase load bridge connectable to an AC load, and a DC intermediate circuit between the network bridge and the controllable three-phase load bridge, the DC intermediate circuit including a filter capacitor, wherein the controllable three-phase load bridge contains a controllable semiconductor switch for each of the three phases, each controllable semiconductor switch controlled by pulse-width modulation, the method comprising:
   measuring samples of a current of the filter capacitor of the DC intermediate circuit in conjunction with switchings of the controllable semiconductor switches, including measuring a first sample when a gate control pulse of a first of the controllable semiconductor switches ceases and measuring a second sample after a delay subsequent to the starting of a gate control pulse of a second of the controllable semiconductor switches; and
   determining the output current of the frequency converter based on the measured samples,
   wherein the network bridge is one of an inactive network bridge and an active three-phase controllable network bridge having corresponding controllable semiconductor switches.

2. The method according to claim 1,
   wherein the network bridge is the active three-phase controllable network bridge having corresponding controllable semiconductor switches, the method further comprising:
   synchronizing switchings of the controllable semiconductor switches of the active three-phase controllable network bridge and switchings of the controllable three-phase load bridge of the controllable three-phase load bridge by synchronizing corresponding gate control pulses,
   wherein the step of measuring samples includes measuring the samples in conjunction with the synchronized switchings.

3. The method according to claim 1, the step of measuring samples comprising:

measuring the samples of the current of the filter capacitor of the DC intermediate circuit with a current measuring sensor connected in series with the filter capacitor.

4. The method according to claim 1, the step of measuring samples comprising:
   measuring the samples of the current of the filter capacitor of the DC intermediate circuit by measuring a current of a measuring capacitor in parallel with the filter capacitor via a current measuring sensor in series with the measuring capacitor.

5. The method according to claim 1, the step of determining the output current of the frequency converter based on the measured samples comprising:
   determining the output current based on a measured voltage change of the filter capacitor.

6. The method according to claim 1, the step of measuring samples of a current of the filter capacitor of the DC intermediate circuit comprising:
   forming a time integral before measuring the samples.

7. The method according to claim 1, the step of determining the output current of the frequency converter based on the measured samples comprising:
   calculating a rate of change (di/dt).

8. The method according to claim 1, the step of determining the output current of the frequency converter based on the measured samples comprising:
   estimating the output current based on the calculated instantaneous values at a midpoint of a null vector corresponding to when each controllable semiconductor switch is in a common position.

9. An appliance for measuring the output current of a frequency converter, comprising:
   a network bridge connectable to an AC network and including one of an inactive network bridge and an active three-phase controllable network bridge having corresponding controllable semiconductor switches;
   a controllable three-phase load bridge connectable to an AC load and including a controllable semiconductor switch for each of the three phases, each controllable semiconductor switch controlled by pulse-width modulation;
   a DC intermediate circuit between the network bridge and the controllable three-phase load bridge, the DC intermediate circuit including a filter capacitor,
   a control unit including a modulator configured to control the semiconductor switches of the controllable three-phase load bridge with pulse-width modulation; and
   a measuring sensor connected to the filter capacitor of the DC intermediate circuit, the measuring sensor controlled to
   measure samples of a current of the filter capacitor of the DC intermediate circuit in conjunction with switchings of the controllable semiconductor switches by measuring a first sample when a gate control pulse of a first of the controllable semiconductor switches ceases and measuring a second sample after a delay subsequent to the starting of a gate control pulse of a second of the controllable semiconductor switches, and
   determine the output current of the frequency converter based on the measured samples.

10. The appliance according to claim 9,
    wherein the network bridge is the active three-phase controllable network bridge having corresponding controllable semiconductor switches,
    wherein the control unit is configured to synchronize switchings of the controllable semiconductor switches of the active three-phase controllable network bridge and switchings of the controllable three-phase load bridge of the controllable three-phase load bridge by synchronizing corresponding gate control pulses, and wherein the measuring sensor is controlled to measure the samples in conjunction with the synchronized switchings.

11. The appliance according to claim 9, wherein the measuring sensor is connected in series with the filter capacitor and is controlled to measure the samples of the current of the filter capacitor of the DC intermediate circuit.

12. The appliance according to claim 9, further comprising:

a measuring capacitor in parallel with the filter capacitor, wherein the measuring sensor is connected in series with the measuring capacitor and is controlled to measure the samples of the current of the filter capacitor of the DC intermediate circuit by measuring a current of the measuring capacitor.

13. The appliance according to claim 9, wherein the measuring sensor is controlled to determine the output current based on a measured voltage change of the filter capacitor.

14. The appliance according to claim 9, wherein the measuring sensor comprises:

a voltage measurer controlled to measure a voltage of the filter capacitor, wherein the measuring sensor is controlled to calculate the current measurement based on the measured voltage filter capacitor voltage.

15. The appliance according to claim 9, wherein the measuring sensor is controlled to form a time integral from the current measuring signal before the sample-taking.

16. The appliance according to claim 9, wherein the measuring sensor is controlled to calculate a rate of change (di/dt).

17. The appliance according to claim 9, wherein the measuring sensor is controlled to calculate the values of all the output currents and of the input currents at the desired instant based on of the measured rates of change of the current.

18. The appliance according to claim 9, wherein the measuring sensor is controlled to estimate the output current based on the calculated instantaneous values at a midpoint of a null vector corresponding to when each controllable semiconductor switch is in a common position.

19. The appliance according to claim 9, wherein the measuring sensor is a shunt resistor situated in the intermediate circuit.

20. The appliance according to claim 9, wherein the measuring sensor is a transformer based on the Hall effect and situated in the intermediate circuit.

* * * * *